US012172185B2

(12) United States Patent
De Santo et al.

(10) Patent No.: US 12,172,185 B2
(45) Date of Patent: Dec. 24, 2024

(54) SYSTEM AND METHOD FOR FIELD INTERNALLY COATING A PIPE JOINT

(71) Applicant: SAIPEM S.P.A., San Donato Milanese (IT)

(72) Inventors: Maurizio De Santo, San Donato Milanese (IT); Momtchil Kaltchev, San Donato Milanese (IT); Francesco Simone, San Donato Milanese (IT)

(73) Assignee: SAIPEM S.P.A., San Donato Milanese (IT)

( * ) Notice: Subject to any disclaimer, the term of this patent is extended or adjusted under 35 U.S.C. 154(b) by 243 days.

(21) Appl. No.: 17/627,058

(22) PCT Filed: Jul. 16, 2020

(86) PCT No.: PCT/IB2020/056703
§ 371 (c)(1),
(2) Date: Jan. 13, 2022

(87) PCT Pub. No.: WO2021/009709
PCT Pub. Date: Jan. 21, 2021

(65) Prior Publication Data
US 2022/0250109 A1 Aug. 11, 2022

(30) Foreign Application Priority Data
Jul. 16, 2019 (IT) .................. 102019000011901

(51) Int. Cl.
*B05C 7/02* (2006.01)
*B05B 3/02* (2006.01)
(Continued)

(52) U.S. Cl.
CPC .............. *B05C 7/02* (2013.01); *B05B 3/02* (2013.01); *B05B 13/0636* (2013.01); *B05C 7/08* (2013.01);
(Continued)

(58) Field of Classification Search
USPC ........ 118/306, 317, 323, 321, 712, 666, 667
See application file for complete search history.

(56) References Cited

U.S. PATENT DOCUMENTS 3,952,698 A * 4/1976 Beyer .................... B05B 13/00
118/317
4,515,832 A * 5/1985 Roeder ............... B05B 13/0654
427/236
(Continued)

FOREIGN PATENT DOCUMENTS

GB 2258901 2/1993
WO WO 97/06382 2/1997

OTHER PUBLICATIONS

Notification Concerning Submission, Obtention or Transmittal of Priority Document for International Application No. PCT/IB2020/056703 dated Oct. 22, 2020.
(Continued)

*Primary Examiner* — Yewebdar T Tadesse
(74) *Attorney, Agent, or Firm* — Neal, Gerber & Eisenberg LLP

(57) ABSTRACT

A system for field internally coating a pipe joint comprising a polymer application unit, which has a first cart configured to selectively advance inside a pipe; a first and a second tank configured to contain a first and a second polymer component respectively; a mixer to mix the first and the second component; a first and a second pump to feed the first and the second component respectively from the first and the second tank to the mixer, an applicator to apply the polymer to the pipe; and a conduit comprising a free end configured to be placed near the applicator to feed the polymer from the mixer to the applicator.

44 Claims, 4 Drawing Sheets

(51) Int. Cl.
  *B05B 13/06*  (2006.01)
  *B05C 7/08*  (2006.01)
  *B05C 11/10*  (2006.01)
  *F16L 58/10*  (2006.01)
  *F16L 58/18*  (2006.01)

(52) U.S. Cl.
  CPC ...... *B05C 11/1036* (2013.01); *B05C 11/1044* (2013.01); *F16L 58/1027* (2013.01); *F16L 58/181* (2013.01)

(56) References Cited

U.S. PATENT DOCUMENTS

| | | | | |
|---|---|---|---|---|
| 4,590,971 | A * | 5/1986 | Webster | F16L 59/143 138/DIG. 6 |
| 5,141,774 | A * | 8/1992 | Prittinen | B05B 3/1064 427/236 |
| 6,699,324 | B1 * | 3/2004 | Berdin | B05B 13/0636 427/236 |
| 7,707,961 | B2 * | 5/2010 | Alexander | B05B 9/002 118/712 |
| 8,800,396 | B2 | 8/2014 | Langley et al. | |
| 2004/0175239 | A1 | 9/2004 | Pare | |
| 2010/0295198 | A1 * | 11/2010 | Kiest, Jr. | B29C 63/36 118/317 |
| 2013/0269812 | A1 | 10/2013 | Redmond et al. | |
| 2014/0251206 | A1 * | 9/2014 | Kim | B05B 13/005 118/306 |
| 2014/0314952 | A1 * | 10/2014 | Chism | B05B 9/007 427/236 |

OTHER PUBLICATIONS

International Search Report and Written Opinion for International Application No. PCT/IB2020/056703 dated Nov. 13, 2020.

\* cited by examiner

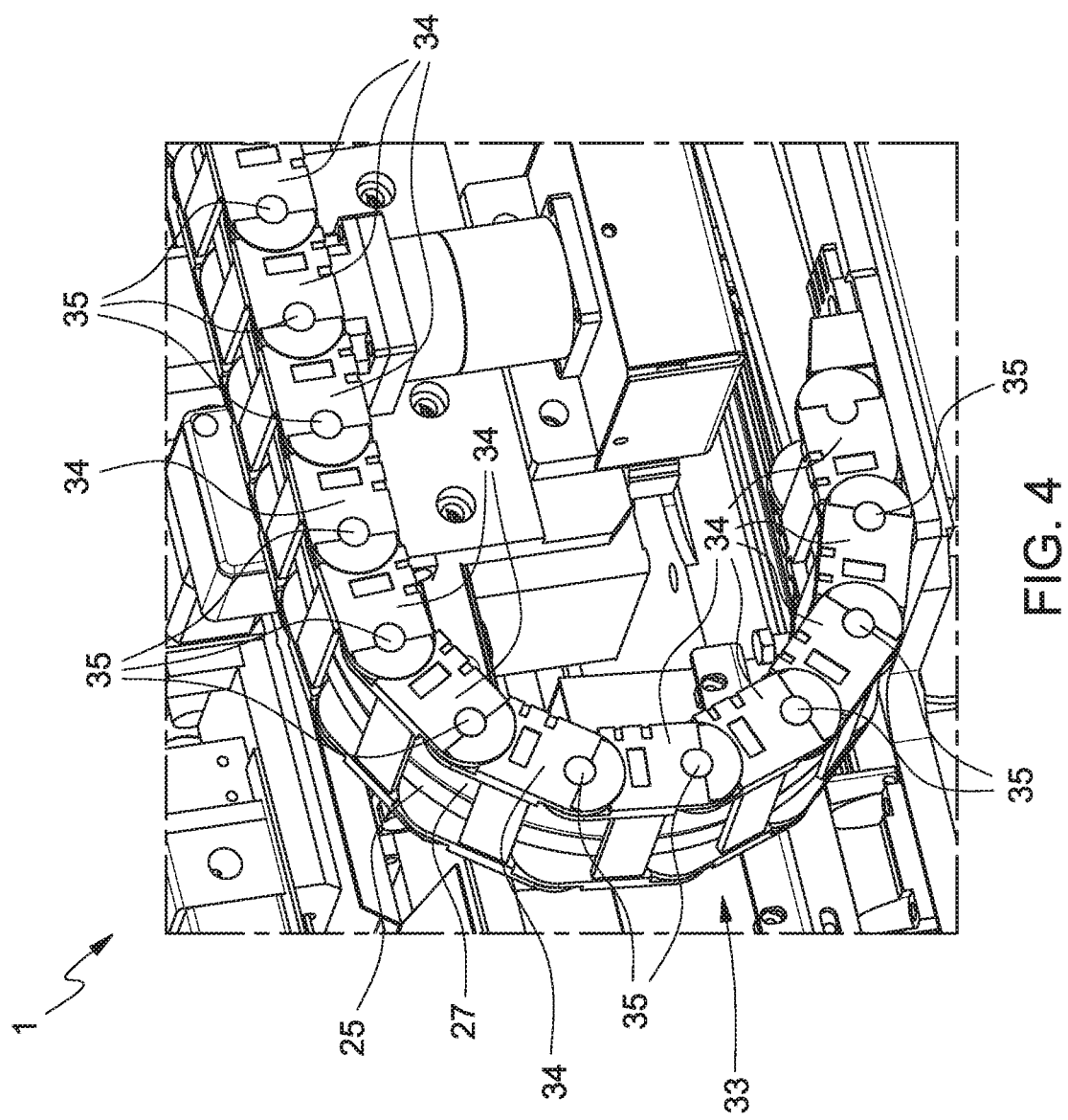

SYSTEM AND METHOD FOR FIELD INTERNALLY COATING A PIPE JOINT

PRIORITY CLAIM

This application is a national stage application of PCT/IB2020/056703, filed on Jul. 16, 2020, which claims the benefit of and priority to Italian Patent Application No. 102019000011901, filed on Jul. 16, 2019, the entire contents of which are each incorporated by reference herein.

TECHNICAL FIELD

The present disclosure relates to a system and method for field internally coating a pipe joint.

BACKGROUND

In particular, the present disclosure relates to a system for internally coating a joint of a metal pipe during the laying operations of said pipe on a bed of a body of water, without limiting thereby the wide range of possible applications of the present disclosure.

Generally, the laying of pipes on a bed of a body of water is carried out by a vessel, which is configured to transport, connect and lay a plurality of pipe sections.

Before being laid on the bed of the body of water, the ends of the pipe sections are field welded together to form a pipe.

In more detail, one end of a pipe section is welded to one end of the pipe and then the vessel is advanced to allow the introduction of said pipe section into the body of water.

The internal and external surfaces of each pipe section are coated with at least one coating to prevent corrosion, heat loss and to reduce the pressure drop of the transported fluid.

This coating is generally applied to each pipe section during the manufacturing stage, in a pipe section manufacturing plant.

However, the end portion of each pipe section is not coated because the high temperatures of the welding could damage the coating.

Therefore, the inner and outer surfaces of the welded end of each pipe section must be coated in the field after welding.

Generally, the coating is made by the application of a polymer, such as an epoxy resin, which must be applied to the inner surface of the pipe section at a temperature within a predetermined range.

As known from U.S. Pat. No. 8,800,396 and GB Patent No. 2,258,901, a machine configured to advance inside the pipe is used to field coat the inner surface of the pipe sections, comprising a coating transport system and an applicator to apply the coating to the inner surface of the pipe with FBE resins, which enable relatively thin coatings to be produced.

SUMMARY

The purpose of the present disclosure is to provide a system for field internally coating a pipe joint which overcomes certain of the drawbacks of certain of the prior art.

According to the present disclosure a system is provided for field internally coating a pipe joint; the system comprising a polymer application unit, which comprises:
  a first cart configured to selectively advance inside a pipe in a direction parallel to the longitudinal axis of the pipe;
  a first and a second tank configured to contain a first and a second polymer component respectively;
  a mixer to mix the first and the second component;
  a first and a second pump to feed the first and the second component respectively from the first and the second tank to the mixer;
  an applicator to apply the polymer to the pipe; and
  a conduit comprising a free end configured to be placed near the applicator to feed the polymer from the mixer to the applicator.

In accordance with the present disclosure, it is possible to store, feed and mix the components of a two-component polymer in the application unit inside the pipe. In particular, the mixing of the polymer components is carried out in a mixer just before the polymer is applied to the inner surface of the pipe to achieve optimal mixing of the components and to promote an optimal coating of the joint with elevated thicknesses.

In particular, the polymer application unit comprises a first and a second motor, such as electric motors, configured to independently control the first and second pump so as to selectively vary the respective flow rates of the first and the second pump. In this way, the flow rate of each component fed to the mixer can be adjusted independently to accurately vary the composition of the polymer applied to the inner surface of the pipe.

In particular, the applicator comprises a first rotating body, such as in the shape of a disc, configured to project the polymer in a centrifugal manner onto the internal surface of the pipe.

In accordance with the rotation of the first rotating body, the polymer is applied homogeneously by centrifugal force diffusion, which determines the atomization of the polymer.

In particular, the applicator comprises a second body having an annular-shaped end facing the first body so as to form an annular cavity to guide the polymer between the first and the second body towards the inner surface of the pipe. In this way, the polymer is diffused through the annular cavity, increasing the precision of the polymer application.

In particular, the polymer application unit comprises at least one sensor, such as at least one camera, to monitor the coating operations. In this way, signals related to the condition of the inner surface of the pipe can be emitted to control the coating operation of the inner surface of the pipe.

In particular, the at least one sensor is configured to rotate at least partially around an axis parallel to the longitudinal axis of the pipe. In this way, the condition of each annular sector of the inner pipe surface can be monitored.

In particular, the polymer application unit comprises a third motor, such as an electric motor, configured to control the rotation of the applicator. In this way, the third motor allows the rotation of the applicator.

In particular, the polymer application unit comprises a first tube to hydraulically connect the first pump to the mixer and a second tube to hydraulically connect the second pump to the mixer; the temperatures of the first and second component in the mixer, in the first and the second tube and in the first and the second pump being maintained within a first and a second predetermined temperature range. In this way, the temperature of the first and second components in the first and second pipe can be kept substantially constant and the first and second components can be fed to the mixer at a pre-established first and second temperature.

In particular, the polymer application unit comprises a valve coupled to the mixer and configured to interrupt the supply of the first and the second component to the mixer and avoid mixing the first and the second component. In this way, during interruptions in the polymer application process, the mixing and feeding of the polymer to the applicator is interrupted and prevents unwanted and uncontrolled mixing of the first and second components.

In particular, the polymer application unit comprises a third tube and a fourth tube, which hydraulically connect the valve respectively to the first and the second tank and allow the recirculation of the first and the second component in the first and the second tank; the valve being configured to selectively feed the first and the second component to the mixer or to the third and the fourth tube. In this way, the first and second pumps continue to operate even when the polymer application is interrupted.

The ratio of surface area to volume of the tubes is greater than the ratio of surface area to volume of the tanks. In other words, the heating power of said tubes is greater than the heating power of said tanks. As a result, the recirculation of the first and second component is carried out to bring the first and second component to a given optimum temperature for the specific application.

In particular, the first, the second, the third and the fourth tube are coated with an insulating material. In this way, the chemical-physical properties of the first and second component in the polymer application unit can be relatively precisely controlled.

In particular, the polymer application unit comprises a second cart configured to slide on the first cart in a direction parallel to the longitudinal axis of the pipe to move the mixer, the applicator and the conduit with respect to the first cart. In this way, the second cart allows the applicator and mixer to move independently of the first cart.

In particular, during coating operations, the second cart allows the reciprocating movement of the applicator around the portion of the internal surface of the pipe to be coated so as to apply a plurality of polymer coats on the internal surface of the pipe, avoiding the movement of the first cart and allowing relative considerable energy savings.

In particular, the second cart is motorized so as to control the position of the second cart with respect to the first cart. In this way, the sliding of the second cart on the first cart can be controlled in a relatively simple and effective way.

In particular, the first and second pumps and the first and second tanks are fixed on the first cart. In this way, the second cart allows the applicator and mixer to move independently of the first and second tank and of the first and second pump.

In particular, the polymer application unit comprises a drip tray for the polymer; said free end of the conduit being selectively movable between the applicator and the drip tray. In this way, and in consideration of the fact that relatively longer interruptions than the normally predefined ones may occur between one application of the polymer and the next due to unforeseen circumstances, the polymer can be fed from the duct to the drip tray, preventing the polymer from polymerising inside the mixer and the duct.

In particular, the polymer application unit comprises a third cart configured to slide in a direction parallel to the longitudinal axis of the pipe to move the mixer and the free end of the conduit with respect to the applicator. In this way, the third cart allows the mixer and the conduit to be moved independently of the applicator.

In more detail, during the momentary interruption of the polymer application operations, the third cart can be moved to place the free end of the conduit at the drip tray and feed the polymer into the drip tray.

In particular, the third cart is motorized so as to control the position of the third cart relatively simply and effectively.

In particular, the polymer application unit comprises at least one containment device for each tube, which is configured to control the curvature of the respective tube and avoid contact between the respective tube and the inner surface of the pipe. In this way, each flexible tube is guided by the respective containment element so that, while one of the second or third carts is sliding on another of the first and second carts, each flexible tube does not come into contact with the inner surface of the pipe or obstruct the sliding of the carts.

In particular, the system comprises a finishing unit of the inner surface of the pipe, configured to prepare the inner surface of the pipe for the polymer application, and a locomotion unit configured to move the polymer application unit and the finishing unit inside the pipe. In this way, the system is able to machine the inner surface of the pipe independently and move around inside the pipe.

In particular, the finishing unit comprises at least one tank configured to contain an abrasive material; a rotating wheel configured to centrifugally emit the abrasive material onto the inner surface of the pipe; a device to recover the abrasive material; and a containment chamber, configured to contain the rotating wheel and the recovery device, and to delimit the portion of pipe where the abrasive material is emitted. In this way, the surface portion of the pipe to be coated is subjected to a finishing treatment, such as sandblasting, to eliminate irregularities.

Another purpose of the present disclosure is to devise a method for field internally coating a pipe joint which overcomes at least one of the drawbacks of certain of the prior art.

According to the present disclosure a method for field internally coating a pipe joint by the application of a polymer is provided, the method comprising:

selectively advancing a polymer application unit inside a pipe in a direction parallel to the longitudinal axis of the pipe;

feeding through a first and a second pump respectively the first and the second component from the first and the second tank to a mixer;

mixing the first and second component to form a polymer with a specific composition;

feeding the polymer from the mixer to a rotating disc applicator via a conduit; and applying the polymer to the pipe by the applicator.

It should be appreciated that according to this method, it is possible to internally coat a pipe joint in a relatively effective manner and to make coatings of elevated thickness.

In particular, the method comprises independently controlling the first and second pump. In this way, it is possible to independently vary the flow rate of the first and second components fed to the mixer to vary the chemical-physical characteristics of the polymer.

In particular, the method comprises monitoring the coating operations and inspecting the inner surface of the pipe by at least one sensor, such as at least one camera. In this way, it is possible to emit signals related to the chemical-physical characteristics of the inner surface of the pipe and the coating operations to control and monitor the coating operations.

In particular, the method comprises maintaining within a first and a second predetermined temperature range, the temperatures of the first and the second component in the mixer, in the first and the second pump, and in a first and a second tube respectively connecting the first and the second pump to the mixer. In this way, the first and second components are fed to the mixer at a first fixed temperature and a second fixed temperature respectively.

In particular, the method involves moving the mixer, the applicator and the conduit in relation to the first and second pump and the first and second tanks. In other words, during the coating application operations, it is possible to move the applicator keeping the first and second tanks and the first and second pumps stationary. In this way, the coating can be applied precisely to the inner surface of the pipe section to be coated and several coats can be applied without moving the entire system, thus saving energy.

In particular, the method involves moving the mixer and one free end of the conduit relative to the applicator.

In particular, the method comprises selectively feeding the polymer into a drip tray.

In particular, the method comprises selectively moving one free end of the conduit between the applicator and the drip tray. In this way, it is possible to keep the polymer moving inside the mixer and the conduit in the event of particularly prolonged stops, during which the polymer could polymerise in the mixer and in the conduit.

BRIEF DESCRIPTION OF THE DRAWINGS

Other characteristics and advantages of the present disclosure will become clear from the following description of a non-limiting example of an embodiment made with reference to the appended drawings, wherein:

FIG. 4 is a perspective view, with parts removed for clarity, of a detail of the system of FIG. 1.

DETAILED DESCRIPTION

Figure 1:
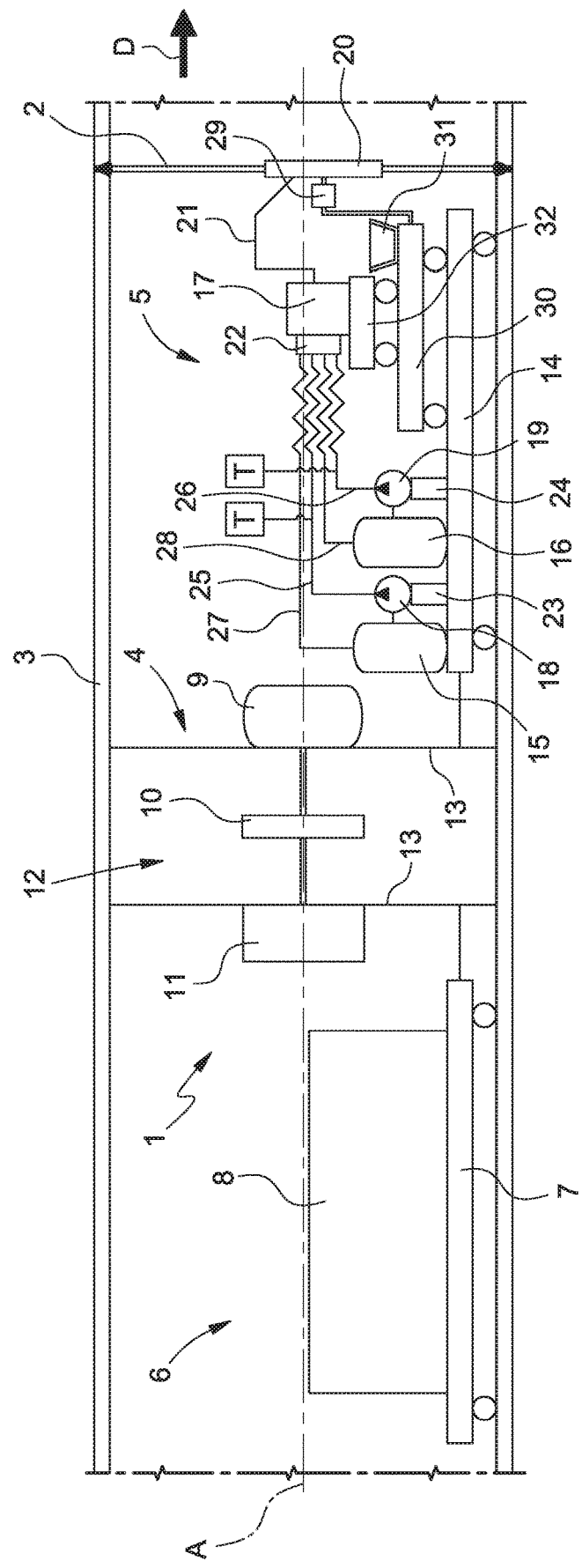
FIG. 1 is a schematic representation of a system for field internally coating a pipe joint according to the present disclosure in a particular operating configuration.

With reference to FIG. 1, reference numeral 1 globally denotes a system for field internally coating a pipe joint 2 of a pipe 3 having a longitudinal axis A.

The system 1 comprises a finishing unit 4 of the inner surface of the pipe 3, configured to prepare the inner surface of the pipe 3 for the polymer application; a polymer application unit 5, configured to apply the polymer to the inner surface of the pipe 3; and a locomotion unit 6 configured to move the polymer application unit 5 and the finishing unit 4 inside the pipe 3 in a direction D parallel to the longitudinal axis A.

The finishing unit 4, the polymer application unit 5 and the locomotion unit 6 are connected to each other.

In the case shown in FIG. 1, the finishing unit 4 is connected at one end to the polymer application unit 5 and at another end to the locomotion unit 6, but other connection configurations between the finishing unit 4, polymer application unit 5 and locomotion unit 6 are also possible.

The locomotion unit 6 comprises a cart 7, which is configured to move inside the pipe 3 in the direction D; and a motor unit 8, which is configured to provide the necessary propulsion to the locomotion unit 6 to move the entire system 1 inside the pipe 3 in the direction D.

Although only one locomotion unit 6 is shown in FIG. 1, the system 1 may comprise a plurality of interconnected locomotion units 6.

The finishing unit 4 comprises at least one tank 9 configured to contain an abrasive material; a rotating wheel 10 configured to centrifugally emit the abrasive material onto the inner surface of the pipe 3; a recovery device 11 of the abrasive material; and a containment chamber 12, bounded by two walls 13 and configured to contain the rotating wheel 10 and to delimit the section of pipe 3 onto which the abrasive material is emitted.

According to an embodiment not shown in the drawings, the recovery device 11 comprises a suction nozzle of the abrasive material, which slides along a guide in a direction substantially perpendicular to the longitudinal axis A and is actuated by an actuator, such as a pneumatic cylinder, and by a motor, such as a linear stepped motor, so as to enable the sliding of the suction nozzle along said guide. In more detail, said actuator is configured to move the suction nozzle from a parking position to a working position and said motor is configured to position the suction nozzle at a precise distance from the pipe surface 3.

The polymer application unit 5 comprises a cart 14 configured to selectively advance inside the pipe 3 in the direction D; a tank 15 and a tank 16, which are configured to contain a first and second polymer component respectively; a mixer 17, such as a static mixer, configured to mix the first and second component; a pump 18 and a pump 19 to supply the first and second component respectively from the tank 15 and the tank 16 to the mixer 17; an applicator 20 configured to apply the polymer to the pipe 3; and a conduit 21 having a free end configured to be placed near the applicator 20 to supply the polymer from the mixer 17 to the applicator 20.

The first component is a base polymer component, while the second component is the curing component.

The polymer is composed of a two-component liquid epoxy polymer mixture. In certain embodiments, the polymer is a thermosetting epoxy resin. For example, the product SP-9888® manufactured by Specialty Polymer Coating Inc. #100, 5350-272nd Street Langley, BC V4W 1S3, is particularly suitable for this purpose.

In the case in FIG. 1, the tanks 15 and 16 are fixed to the cart 14 and supply the respective pumps 18 and 19, which are fixed to the cart 14.

The polymer application unit 5 comprises a valve 22 coupled to the mixer 17 and configured to selectively cut off the supply of the first and second component to the mixer 17 and selectively prevent mixing of the first and second component; two electric motors 23 and 24, which are attached to the cart 14 and control the respective pumps 18 and 19; two flexible tubes 25 and 26, which hydraulically connect the pumps 18 and 19 to the mixer 17 through the valve 22; and two flexible hoses 27 and 28, which hydraulically connect the valve 22 to the tank 15 and tank 16 respectively and enable recirculation of the first and second component in the respective tanks 15 and 16.

According to an embodiment not shown in the drawings, the tubes 27 and 28 respectively connect the tubes 25 and 26 to the respective tanks 15 and 16 and are equipped with respective recirculation valves, which are configured to selectively close or open the passage of the first and second component to the respective tanks 15 and 16 so as to enable or prevent recirculation of the first and second component.

In certain embodiments, the tubes 25, 26, 27 and 28 are coated with an insulating material to keep the temperature of the first and second component constant inside the tubes 25, 26, 27 and 28.

In addition, the temperature of the first and second components in the tanks 15 and 16 and in the valve 22 is kept constant.

In more detail, the polymer application unit 5 comprises a plurality of temperature sensors to measure the temperature of the first component in the tank 15, pump 18, tube 25, tube 27 and mixer 17 and to measure the temperature of the second component in the tank 16, pump 19, tube 26, tube 28 and mixer 17.

According to a particular embodiment, the polymer application unit 5 comprises at least one heat exchange device (not shown in the drawings) configured to regulate the temperature of the first and second components inside the tubes 25, 26, 27 and 28.

The applicator 20 comprises a first, rotating, disc-shaped body and a second body with an annular-shaped end facing the first body to form an annular cavity to centrifugally emit the polymer from the annular cavity onto the inner surface of the pipe 3.

According to one embodiment of the present disclosure, the rotation axis of the first rotating body substantially coincides with the longitudinal axis A of the pipe 3.

The polymer application unit 5 comprises an electric motor 29 configured to control the rotation of the first rotating body.

In certain embodiments, the polymer application unit 5 comprises at least one sensor (not shown in the drawings) which is configured to rotate at least partially around an axis parallel to the longitudinal axis A and to monitor the coating operations.

In a particular embodiment, the polymer application unit 5 comprises a camera (not shown in the drawings) which is configured to rotate around the longitudinal axis A to provide video and/or images of the inner surface of the pipe 3.

In the case shown in FIG. 1, the polymer application unit 5 comprises a cart 30 motorized and configured to slide on the cart 14 in the direction D; a polymer drip tray 31; and a motorized cart 32 configured to slide in the direction D. In other words, the cart 30 is configured to control its position relative to the cart 14, and the cart 32 is configured to control its position relative to the cart 14 and the cart 30.

The applicator 20 and drip tray 31 are arranged on the cart 30 so that they slide in the direction D with respect to the cart 14.

One end of the conduit 21 is attached to the mixer 17, which is located on the cart 32 so as to enable the sliding of the conduit 21 and mixer 17 with respect to the cart 14 and cart 30 in the direction D, selectively enabling the polymer to be fed from the conduit 21 to the applicator 20 or from the conduit 21 to the drip tray 31.

With reference to FIG. 4, the polymer application unit 5 comprises at least one containment device 33 for each tube 25, 26, 27, 28, which is configured to control the curvature of the respective tube 25, 26, 27, 28 and avoid contact between the respective tube 25, 26, 27, 28 and the inner surface of the pipe 3.

Each containment device 33 comprises a plurality of meshes 34 coupled together by pins 35 so as to enable a relative rotation between the coupled meshes 34.

In use and with reference to FIG. 1, the system 1 is inserted in the pipe 3 and is moved by the locomotion unit 6 to slide in the direction D and position the finishing unit 4 near the joint 2.

In more detail, the finishing unit 4 is moved inside the pipe 3 in such a way that the joint 2 is enclosed between the walls 13 of the containment chamber 12.

Subsequently, the abrasive material is fed from the tank 9 to the rotating wheel 10, which, by turning, emits the abrasive material centrifugally on the internal surface of the pipe 3 at the joint 2 to eliminate the irregularities of the internal surface of the pipe 3 caused by the welding process to facilitate the subsequent application of the polymer.

The abrasive material is recovered by the recovery device 11 for possible reuse later in a further finishing process.

At the end of the finishing process, the system 1 is again moved by the locomotion unit 6 in the direction D, to position the applicator 20 near the joint 2 and start the polymer application process.

At this stage, the pumps 18 and 19 feed the first component and the second component from the tanks 15 and 16 to the mixer 17 via the valve 22.

The motors 23 and 24 respectively control the pumps 18 and 19 independently, so as to regulate the flow rate of the first and second components fed to the mixer 17.

In particular, the motors 23 and 24 are configured to control the pumps 18 and 19 so as to progressively vary the flow rate of the first and second component at the beginning and at the end of the polymer application operations.

The temperature of the first and second components inside the tubes 25 and 26 is kept constant.

In the mixer 17, the first and second components are mixed to form the polymer to be applied to the inner surface of the pipe 3.

The polymer obtained by mixing the first and second components is fed from the mixer 17 to the conduit 21, which in turn feeds the applicator 20 through the free end of the conduit 21.

The first body of the applicator 20 is rotated by the electric motor 29 and centrifugally projects the polymer onto the inner surface of the pipe 3 at the joint 2.

Figure 2:
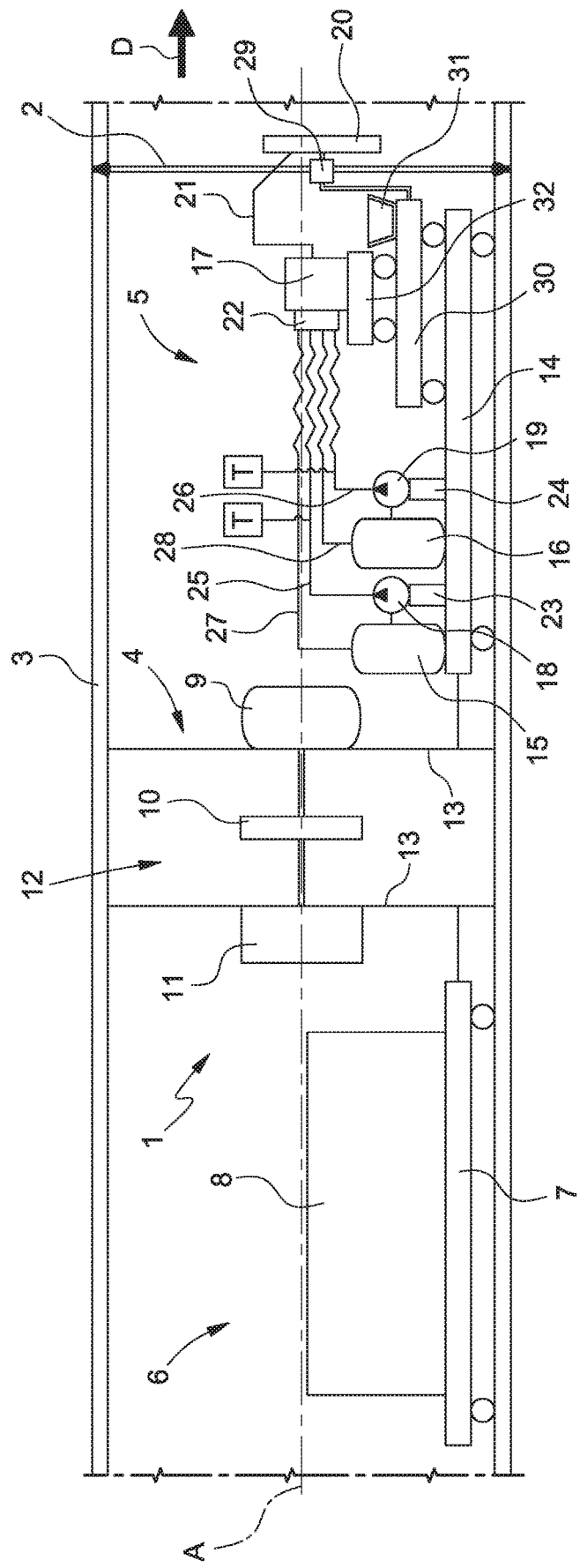
FIGS. 2 and 3 are schematic representations of the system of FIG. 1 in further operating configurations.

With reference to FIG. 2, the cart 30 slides on the cart 14 varying the position of the applicator 20 in the direction D without moving the cart 14 connected to the entire system 1.

In more detail, the cart 30 slides alternately along the direction D to apply a plurality of coats to the internal surface of the pipe 3 at the joint 2.

Figure 3:
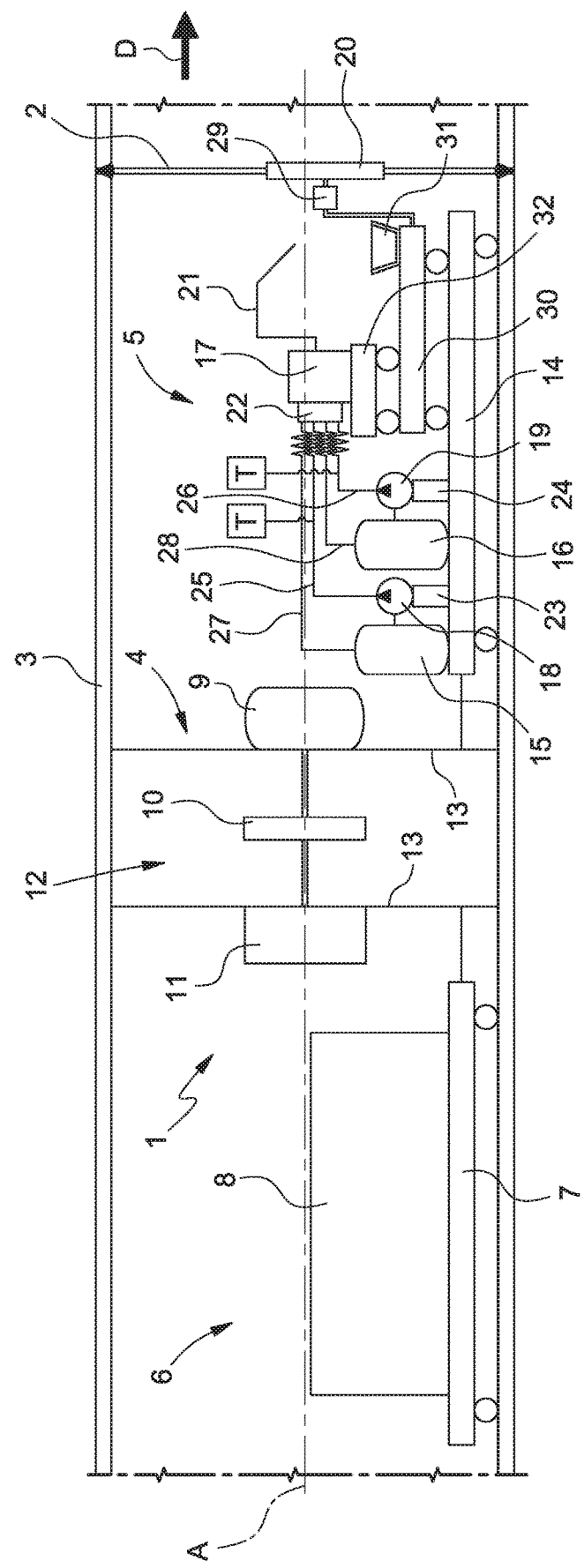

With reference to FIG. 3, during a prolonged interruption of coating operations, the cart 32 slides on the cart 30 in the direction D, so as to place the free end of the conduit 21 at the drip tray 31, to feed the polymer from the conduit 21 to the drip tray 31.

At this stage, the valve 22 interrupts the supply of the first and second components to the mixer 17 and directs the flow of the first and second components to the tubes 27 and 28 respectively so that the first and second components can be recirculated to the tank 15 and the tank 16.

According to a variant of the present disclosure, the valve 22 continues to feed the first and second components to the mixer 17 to prevent the polymer from hardening in the mixer 17.

The tubes 25, 26, 27 and 28 are flexible and therefore do not obstruct the sliding of the cart 30 on the cart 14 and the sliding of the cart 32 on the cart 30.

A plurality of sensors (not shown in the drawings) monitor the progress of the finishing and polymer application operations, and measure the chemical-physical characteristics of the internal surface of the pipe 3.

Although in this description the system 1 is used for the internal coating of joints 2 of a pipe 3 when laying the pipe 3 on a bed of a body of water, the system 1 can be used for internally coating a generic cylindrical body in other fields of application.

According to an alternative embodiment, the cart 32 is omitted and the mixer 17 is placed on the cart 30.

According to a further alternative embodiment, the cart 30 is omitted and the drip tray 31 and applicator 20 are placed on the cart 14.

It is clear that the present disclosure includes variations that are not specifically described and fall within the scope of the protection of the following claims. That is, the present disclosure also covers embodiments that are not described in the detailed description above as well as equivalent embodiments that are part of the scope of protection set forth in the claims. Accordingly, various changes and modifications to the presently disclosed embodiments will be apparent to those skilled in the art.

The invention claimed is:

1. A system comprising:
a polymer application unit comprising:
a first cart configured to selectively advance inside a pipe in a direction parallel to a longitudinal axis of the pipe;
a first tank configured to contain a first polymer component;
a second tank configured to contain a second polymer component;
a mixer configured to mix the first polymer component and the second polymer component to form a polymer;
a first pump configured to feed the first polymer component from the first tank to the mixer;
a second pump configured to feed the second polymer component from the second tank to the mixer;
an applicator configured to apply the polymer to the pipe;
a conduit comprising a free end configured to be placed within a designated distance of the applicator to feed the polymer from the mixer to the applicator; and
a second cart configured to slide along the first cart in the direction parallel to the longitudinal axis of the pipe to move each of the mixer, the applicator and the conduit with respect to the first cart.

2. The system of claim 1, wherein the polymer application unit further comprises:
a first motor configured to independently control the first pump to selectively vary a first flow rate of the first pump, and
a second motor configured to independently control the second pump to selectively vary a second flow rate of the second pump.

3. The system of claim 1, wherein the applicator of the polymer application unit further comprises a first rotating body configured to centrifugally project the polymer onto an inner surface of the pipe.

4. The system of claim 3, wherein the applicator of the polymer application unit further comprises a second body having an annular-shaped end facing the first rotating body to define an annular cavity to guide the polymer between the first rotating body and the second body towards the inner surface of the pipe.

5. The system of claim 1, wherein the polymer application unit further comprises a sensor to monitor the application of the polymer to the pipe.

6. The system of claim 5, wherein the sensor is configured to rotate at least partially around an axis parallel to the longitudinal axis of the pipe.

7. The system of claim 1, wherein the polymer application unit further comprises a motor configured to control a rotation of the applicator.

8. The system of claim 1, wherein the polymer application unit further comprises a first tube configured to hydraulically connect the first pump to the mixer and a second tube configured to hydraulically connect the second pump to the mixer, wherein the first polymer component in the mixer, in the first tube and in the first pump are maintained within a first predetermined temperature range, and the second polymer component in the mixer, in the second tube and in the second pump are maintained within a second predetermined temperature range.

9. The system of claim 8, wherein the polymer application unit further comprises a valve coupled to the mixer and configured to interrupt a supply of the first polymer component and the second polymer component to the mixer to avoid mixing the first polymer component and the second polymer component.

10. The system of claim 9, wherein:
the polymer application unit further comprises:
a third tube configured to hydraulically connect the valve to the first tank and enable a recirculation of the first polymer component in the first tank, and
a fourth tube configured to hydraulically connect the valve to the second tank and enable a recirculation of the second polymer component in the second tank; and
the valve is configured to:
selectively feed the first polymer component to any of the mixer and the third tube, and
selectively feed the second polymer component to any of the mixer and the fourth tube.

11. The system of claim 10, wherein each of the first tube, the second tube, the third tube and the fourth tube are coated with an insulating material.

12. The system of claim 10, wherein the polymer application unit further comprises, for each of the tubes, a containment device configured to control a curvature of that tube and avoid contact between that tube and an inner surface of the pipe.

13. The system of claim 1, wherein the second cart is motorized to control a position of the second cart with respect to the first cart.

14. The system of claim 1, wherein the polymer application unit further comprises a drip tray, the free end of the conduit being selectively movable between the applicator and the drip tray.

15. The system of claim 1, further comprising:
a finishing unit configured to prepare an inner surface of the pipe for the application of the polymer, and
a locomotion unit configured to move the polymer application unit and the finishing unit within the pipe.

16. A system comprising:
a polymer application unit comprising:
a first cart configured to selectively advance inside a pipe in a direction parallel to a longitudinal axis of the pipe;
a first tank configured to contain a first polymer component;
a second tank configured to contain a second polymer component;
a mixer configured to mix the first polymer component and the second polymer component to form a polymer;
a first pump configured to feed the first polymer component from the first tank to the mixer;
a second pump configured to feed the second polymer component from the second tank to the mixer, wherein the first pump, the second pump, the first tank and the second tank are each fixed on the first cart;
an applicator configured to apply the polymer to the pipe; and
a conduit comprising a free end configured to be placed within a designated distance of the applicator to feed the polymer from the mixer to the applicator.

17. The system of claim 16, wherein the polymer application unit further comprises:
  a first motor configured to independently control the first pump to selectively vary a first flow rate of the first pump, and
  a second motor configured to independently control the second pump to selectively vary a second flow rate of the second pump.

18. The system of claim 16, wherein the applicator of the polymer application unit further comprises a first rotating body configured to centrifugally project the polymer onto an inner surface of the pipe.

19. The system of claim 18, wherein the applicator of the polymer application unit further comprises a second body having an annular-shaped end facing the first rotating body to define an annular cavity to guide the polymer between the first rotating body and the second body towards the inner surface of the pipe.

20. The system of claim 16, wherein the polymer application unit further comprises a sensor to monitor the application of the polymer to the pipe.

21. The system of claim 20, wherein the sensor is configured to rotate at least partially around an axis parallel to the longitudinal axis of the pipe.

22. The system of claim 16, wherein the polymer application unit further comprises a motor configured to control a rotation of the applicator.

23. The system of claim 16, wherein the polymer application unit further comprises a first tube configured to hydraulically connect the first pump to the mixer and a second tube configured to hydraulically connect the second pump to the mixer, wherein the first polymer component in the mixer, in the first tube and in the first pump are maintained within a first predetermined temperature range, and the second polymer component in the mixer, in the second tube and in the second pump are maintained within a second predetermined temperature range.

24. The system of claim 23, wherein the polymer application unit further comprises a valve coupled to the mixer and configured to interrupt a supply of the first polymer component and the second polymer component to the mixer to avoid mixing the first polymer component and the second polymer component.

25. The system of claim 24, wherein:
  the polymer application unit further comprises:
    a third tube configured to hydraulically connect the valve to the first tank and enable a recirculation of the first polymer component in the first tank, and
    a fourth tube configured to hydraulically connect the valve to the second tank and enable a recirculation of the second polymer component in the second tank; and
  the valve is configured to:
    selectively feed the first polymer component to any of the mixer and the third tube, and
    selectively feed the second polymer component to any of the mixer and the fourth tube.

26. The system of claim 25, wherein each of the first tube, the second tube, the third tube and the fourth tube are coated with an insulating material.

27. The system of claim 25, wherein the polymer application unit further comprises, for each of the tubes, a containment device configured to control a curvature of that tube and avoid contact between that tube and an inner surface of the pipe.

28. The system of claim 16, wherein the polymer application unit further comprises a drip tray, the free end of the conduit being selectively movable between the applicator and the drip tray.

29. The system of claim 16, further comprising:
  a finishing unit configured to prepare an inner surface of the pipe for the application of the polymer, and
  a locomotion unit configured to move the polymer application unit and the finishing unit within the pipe.

30. A system comprising:
  a polymer application unit comprising:
    a first cart configured to selectively advance inside a pipe in a direction parallel to a longitudinal axis of the pipe;
    a first tank configured to contain a first polymer component;
    a second tank configured to contain a second polymer component;
    a mixer configured to mix the first polymer component and the second polymer component to form a polymer;
    a first pump configured to feed the first polymer component from the first tank to the mixer;
    a second pump configured to feed the second polymer component from the second tank to the mixer;
    an applicator configured to apply the polymer to the pipe;
    a conduit comprising a free end configured to be placed within a designated distance of the applicator to feed the polymer from the mixer to the applicator; and
    a second cart configured to slide in the direction parallel to the longitudinal axis of the pipe to move the mixer and the free end of the conduit with respect to the applicator.

31. The system of claim 30, wherein the polymer application unit further comprises:
  a first motor configured to independently control the first pump to selectively vary a first flow rate of the first pump, and
  a second motor configured to independently control the second pump to selectively vary a second flow rate of the second pump.

32. The system of claim 30, wherein the applicator of the polymer application unit further comprises a first rotating body configured to centrifugally project the polymer onto an inner surface of the pipe.

33. The system of claim 32, wherein the applicator of the polymer application unit further comprises a second body having an annular-shaped end facing the first rotating body to define an annular cavity to guide the polymer between the first rotating body and the second body towards the inner surface of the pipe.

34. The system of claim 30, wherein the polymer application unit further comprises a sensor to monitor the application of the polymer to the pipe.

35. The system of claim 34, wherein the sensor is configured to rotate at least partially around an axis parallel to the longitudinal axis of the pipe.

36. The system of claim 30, wherein the polymer application unit further comprises a motor configured to control a rotation of the applicator.

37. The system of claim 30, wherein the polymer application unit further comprises a first tube configured to hydraulically connect the first pump to the mixer and a second tube configured to hydraulically connect the second pump to the mixer, wherein the first polymer component in the mixer, in the first tube and in the first pump are maintained within a first predetermined temperature range, and the second polymer component in the mixer, in the second tube and in the second pump are maintained within a second predetermined temperature range.

38. The system of claim 37, wherein the polymer application unit further comprises a valve coupled to the mixer and configured to interrupt a supply of the first polymer component and the second polymer component to the mixer to avoid mixing the first polymer component and the second polymer component.

39. The system of claim 38, wherein:
the polymer application unit further comprises:
a third tube configured to hydraulically connect the valve to the first tank and enable a recirculation of the first polymer component in the first tank, and
a fourth tube configured to hydraulically connect the valve to the second tank and enable a recirculation of the second polymer component in the second tank; and
the valve is configured to:
selectively feed the first polymer component to any of the mixer and the third tube, and
selectively feed the second polymer component to any of the mixer and the fourth tube.

40. The system of claim 39, wherein each of the first tube, the second tube, the third tube and the fourth tube are coated with an insulating material.

41. The system of claim 39, wherein the polymer application unit further comprises, for each of the tubes, a containment device configured to control a curvature of that tube and avoid contact between that tube and an inner surface of the pipe.

42. The system of claim 30, wherein the polymer application unit further comprises a drip tray, the free end of the conduit being selectively movable between the applicator and the drip tray.

43. The system of claim 30, wherein the second cart is motorized to control a position of the second cart.

44. The system of claim 30, further comprising:
a finishing unit configured to prepare an inner surface of the pipe for the application of the polymer, and
a locomotion unit configured to move the polymer application unit and the finishing unit within the pipe.

* * * * *